US008479684B2

(12) United States Patent
Nadreau et al.

(10) Patent No.: US 8,479,684 B2
(45) Date of Patent: Jul. 9, 2013

(54) SUBSTANCE-DISTRIBUTION SYSTEM FOR AN EGG INJECTION DEVICE

(75) Inventors: Michael Nadreau, Landivisiau (FR); Jean-Claude Yvin, Plougoulm (FR); Florent Menguy, Brest (FR)

(73) Assignee: Egg-Chick Automated Technologies, Pace (FR)

( * ) Notice: Subject to any disclaimer, the term of this patent is extended or adjusted under 35 U.S.C. 154(b) by 330 days.

(21) Appl. No.: 12/740,649

(22) PCT Filed: Oct. 16, 2008
(Under 37 CFR 1.47)

(86) PCT No.: PCT/EP2008/063997
§ 371 (c)(1),
(2), (4) Date: Dec. 15, 2010

(87) PCT Pub. No.: WO2009/056455
PCT Pub. Date: May 7, 2009

(65) Prior Publication Data
US 2012/0017835 A1    Jan. 26, 2012

(30) Foreign Application Priority Data
Oct. 31, 2007  (FR) ..................................... 07 07652

(51) Int. Cl.
*A01K 45/00*    (2006.01)
(52) U.S. Cl.
USPC ......................................................... 119/6.8
(58) Field of Classification Search
USPC ..................... 119/6.8; 141/329; 222/372, 380
See application file for complete search history.

(56) References Cited

U.S. PATENT DOCUMENTS

| 4,469,047 | A | * | 9/1984 | Miller .............................. 119/6.8 |
| 4,681,063 | A | | 7/1987 | Hebrank |
| 4,768,919 | A | | 9/1988 | Borgman et al. |
| 4,805,778 | A | | 2/1989 | Nambu |
| 4,903,635 | A | | 2/1990 | Hebrank |
| 4,980,971 | A | | 1/1991 | Bartchat et al. |
| 5,136,979 | A | | 8/1992 | Paul et al. |

(Continued)

FOREIGN PATENT DOCUMENTS

| EP | 1302102 | 4/2003 |
| EP | 1557083 | 7/2005 |

(Continued)

OTHER PUBLICATIONS

International Search Report for International Application No. PCT/EP2008/001046 dated Mar. 26, 2008.

(Continued)

*Primary Examiner* — Kristen C Hayes
(74) *Attorney, Agent, or Firm* — Patterson Thuente Pedersen, P.A.

(57) ABSTRACT

A distribution system for distributing dosed amounts of a treatment substance to a plurality of injectors of an egg injection device, and to an injection device equipped with such a distribution system. The distribution system comprises at least one syringe pump comprising an actuator for actuating the piston of a syringe, a discharge tube connected to the outlet orifice of the syringe, feed tubes connected in parallel to the discharge tube via a valve system, each feed tube being intended to be connected to an injector, and a controller capable of controlling the actuator and the valve system for distributing dosed amount of substance contained in the chamber through the feed tubes, to injectors.

12 Claims, 1 Drawing Sheet

SINGLE FIGURE

U.S. PATENT DOCUMENTS

| | | | |
|---|---|---|---|
| 5,158,210 A * | 10/1992 | Du | 222/134 |
| 5,207,311 A | 5/1993 | Terai | |
| 5,542,574 A * | 8/1996 | Stern | 222/137 |
| 5,895,192 A | 4/1999 | Parnell et al. | |
| 5,898,488 A | 4/1999 | Kuhl | |
| 5,941,696 A | 8/1999 | Fenstermacher et al. | |
| 6,099,264 A * | 8/2000 | Du | 417/300 |
| 6,286,455 B1 | 9/2001 | Williams | |
| 6,338,673 B2 | 1/2002 | Berry et al. | |
| 6,499,428 B1 | 12/2002 | Prindle | |
| 6,535,277 B2 | 3/2003 | Chalker et al. | |
| 2003/0150387 A1 | 8/2003 | Hebrank | |
| 2004/0065263 A1 | 4/2004 | Hebrank et al. | |
| 2005/0030521 A1 | 2/2005 | Phelps et al. | |
| 2005/0132964 A1 | 6/2005 | Breuil et al. | |
| 2005/0284376 A1 | 12/2005 | Smith | |
| 2006/0082759 A1 | 4/2006 | Hebrank | |
| 2006/0185601 A1 | 8/2006 | Correa et al. | |
| 2007/0044721 A1 | 3/2007 | Ilich | |
| 2010/0139567 A1 | 6/2010 | Yvin et al. | |
| 2010/0180821 A1 | 7/2010 | Poulard et al. | |
| 2010/0221093 A1 | 9/2010 | Mogenet et al. | |
| 2010/0307419 A1 | 12/2010 | Nadreau et al. | |

FOREIGN PATENT DOCUMENTS

| | | |
|---|---|---|
| FR | 2858919 | 2/2005 |
| FR | 2873894 | 2/2006 |
| WO | WO 98/31216 | 7/1998 |
| WO | WO2006/078499 | 7/2006 |

OTHER PUBLICATIONS

International Preliminary Report on Patentability and Written Opinion dated May 4, 2010 from International Application No. PCT/EP2008/063997.

International Preliminary Report on Patentability and Written Opinion dated Mar. 2, 2010 from International Application No. PCT/EP2008/061250.

Application and File History for U.S. Appl. No. 12/527,536, filed Dec. 15, 2009, inventor Yvin.

Application and File History for U.S. Appl. No. 12/675,946, filed Mar. 1, 2010, inventors Nadreau et al.

Application and File History for U.S. Appl. No. 12/527,541, filed May 4, 2010, inventors Mogenet et al.

* cited by examiner

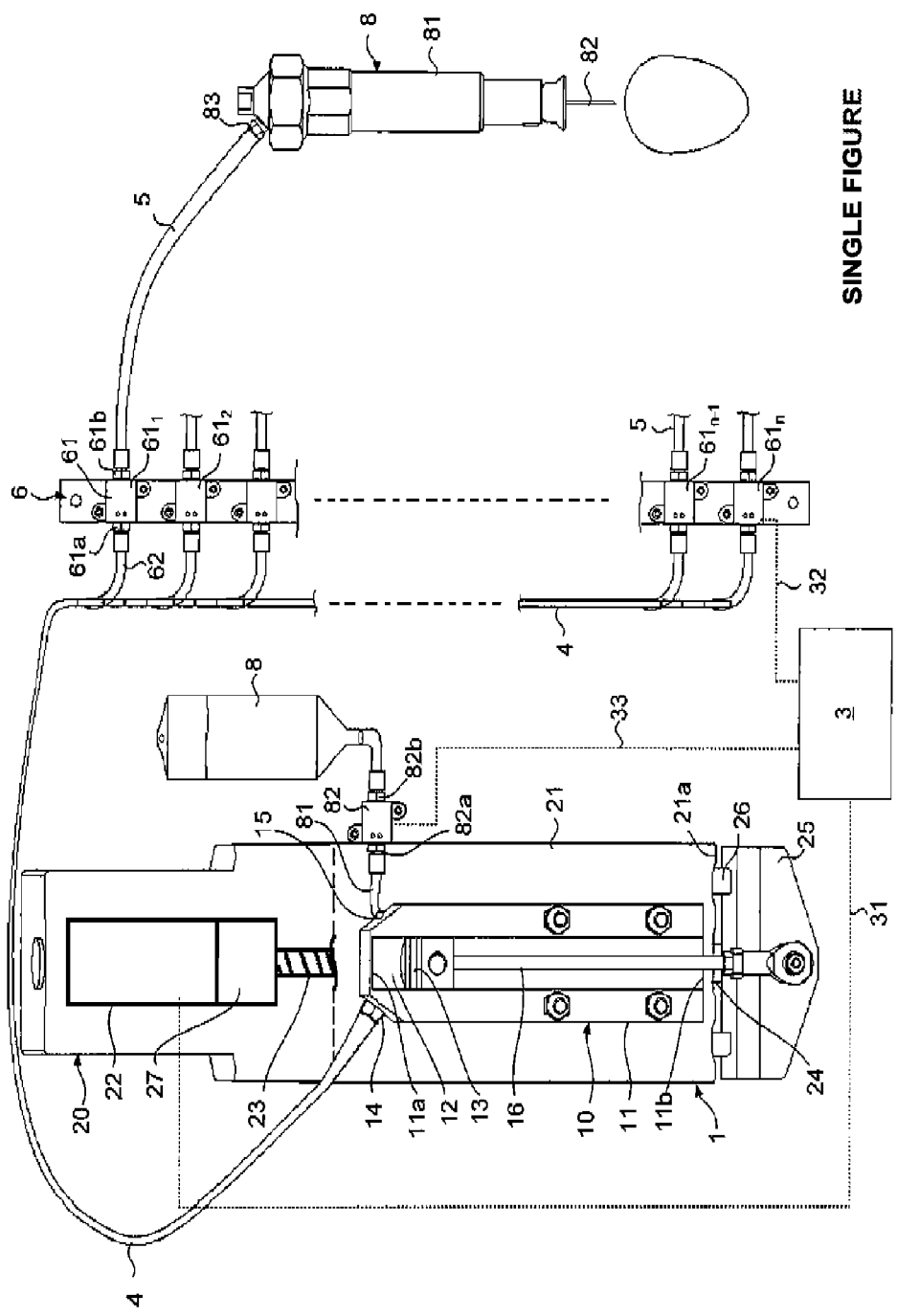
SINGLE FIGURE

SUBSTANCE-DISTRIBUTION SYSTEM FOR AN EGG INJECTION DEVICE

PRIORITY CLAIM

The present application is a National Phase entry of PCT Application No. PCT/EP2008/063997, filed Oct. 16, 2008, which claims priority from French Application No. 0707652, filed Oct. 31, 2007, the disclosures of which are hereby incorporated by reference herein in their entirety.

FIELD OF THE INVENTION

The present invention relates to a distribution system for distributing dosed amounts of a treatment substance to a plurality of injectors of a device for injecting a substance into a plurality of eggs, in particular bird eggs, and to an injection device equipped with such a distribution system.

BACKGROUND ART

Injection devices are known for directly injecting into the treatment substances, such as vaccines, antibiotics or vitamins, in order to limit the mortality rate or to increase growth of the embryos. Such devices conventionally comprise an injection head including a plurality of injectors capable of injecting a substance into a plurality of eggs, the injectors being mobile vertically above a conveyor for transporting eggs to be treated, and a system for distributing a substance to be injected, for distributing dosed amounts of substance to said injectors.

For example, in U.S. Pat. No. 5,941,696, a distribution system was proposed, consisting of a peristaltic pump and of flexible tubes feeding the injectors individually. The rotor of the pump is equipped with rollers which gradually compress tubes for displacing the substance towards the injectors. This type of pump guarantees good accuracy in the delivered amounts of substance. However, flexible tubes are subject to large stresses and have to be regularly replaced. Further, this type of pump requires a bundle of tubes with significant length. For each injector, a tube actually needs to be mounted between the source of substance and the injector, passing through the pump placed at a distance from the injection head. Moreover, this type of pump is not suitable for certain kinds of vaccines, notably vaccines with living cells. Indeed the pump tends to destroy a portion of the living cells during the compression of the tubes and thereby greatly reduces the efficiency of the vaccine.

Distribution systems have also been proposed comprising an individual micropump for each injector. These systems prove to be bulky, very expensive and require significant and delicate maintenance in order to guarantee proper operation of the whole of the injectors.

SUMMARY OF THE INVENTION

An object of the present invention is to propose a substance-distribution system overcoming at least partly the aforementioned drawbacks, and which is of simple design and application.

For this purpose, an object of the present invention is a distribution system for distributing dosed amounts of treatment substance to a plurality of injectors of an egg injection device, including:

at least one syringe pump comprising a syringe body defining a chamber intended to receive a substance, provided at its distal end with an outlet orifice, and a piston slidably mounted in said chamber, and an actuator capable of automatically actuating the piston in order to discharge the substance out of the chamber through the outlet orifice, a discharge tube connected to the outlet orifice, feed tubes connected in parallel through a first end to the discharge tube via a valve system, each feed tube being intended to be connected through its second end to at last one injector, preferably to a single injector, and a controller capable of controlling the actuator and the valve system in order to distribute dosed amounts of substance contained in the chamber through the feed tubes to the injectors.

According to an embodiment of the invention, the distribution system includes a syringe pump for feeding several injectors, by providing several feed tubes connected via a valve system to the discharge tube of the syringe. This distribution system requires tubes of small length, not subject to large mechanical stresses. Further, such a pump is suitable for distributing all types of substances, notably living vaccines.

According to one embodiment, the valve system is capable of individually setting each feed tube in fluidic communication with the discharge tube. The distribution system thereby gives the possibility of independently adjusting the injected amount of substance for each egg, for example depending on its size, and/or of not injecting any substance when the injector is facing an empty cell or an egg which does not have to be treated, such as a clear egg or non-living egg for example. Thus, according to one embodiment, the controller is capable of controlling the actuator and the valve system in order to independently feed the feed tubes with either identical or different dosed amounts, depending on the characteristic of each egg (such as size, clear or fertilized egg, either living or non-living), and/or depending on the presence of an egg or not. In the case of the absence of an egg, or of a clear or non-living egg under an injector, no substance is delivered to the injector.

Advantageously, the controller is capable of controlling the valve system and then the actuator in order to successively feed each feed tube, so as to avoid overpressure of the substance in the discharge tube.

According to one embodiment, the valve system comprises a two-way microvalve, preferably a solenoid valve, for each feed tube, each microvalve being connected through a first orifice to the discharge tube, by means of an intermediate bypass tube, and through its second orifice to a feed tube, each microvalve being individually controlled in opening and closing by the controller.

According to one embodiment, the syringe body is provided at its distal end with a filling orifice to which is connected a filling tube equipped with a valve system, for example a two-way microvalve and in particular a solenoid valve, the valve system intended to be connected to a source of substance, being controlled in opening and closing by the controller, and the actuator being capable of automatically actuating the piston for drawing a substance through the inlet orifice, so that the syringe may be reloaded with substance automatically.

According to one embodiment, the actuator is of the pusher type for a syringe, and comprises a stepping motor mounted on a base, the motor being capable, preferably via a reduction gear, of driving into rotation a worm to which is directly or indirectly connected to the end of a piston rod firmly attached to the piston, so that rotation of the worm generates translational motion of the piston rod, the syringe body being mounted on the base, the motor being controlled by the controller. With such a motor, it is possible to provide the distribution of accurate doses of substance, doses which may easily be adjusted for each injector, at each distributing cycle.

An object of the present invention is also an egg injection device comprising an injection head which includes a plurality of injectors capable of injecting a substance into a plurality of eggs, at least one substance-distribution system as described earlier, for distributing dosed amounts of substance to the injectors. Advantageously, each feed tube is connected a single injector. According to one embodiment, the device comprises several distribution systems, for example four distribution systems, each individually feeding twenty injectors, the device being, for example, provided for treating trays of one hundred fifty eggs. The distribution systems are preferably mounted on a fixed chassis of the injection device bearing the injection head and intended to be positioned above a conveyer for transporting eggs. According to one embodiment, the controller is capable of controlling the actuator and valve system for independently feeding the injectors with either identical or different dosed amounts of substance, adjusted for each injector depending on the characteristic of each egg present under the injector and/or on the presence of an egg to be injected or not under the injector, the device being equipped or connected with a system for determining the characteristics of the eggs and/or detecting the presence of eggs, delivering information regarding the characteristics of the eggs and/or egg presence information to the injection device.

BRIEF DESCRIPTION OF THE DRAWINGS

The invention will be better understood, and other objects, details, characteristics and advantages will become more clearly apparent during the detailed explanatory description which follows, of a particular embodiment of the invention, with reference to the appended schematic drawing wherein the single FIGURE illustrates a schematic view of a substance-distribution system for an injection device.

DETAILED DESCRIPTION

The distribution system comprises a syringe pump 1 or a piston volumetric pump of the syringe-pusher type, comprising a syringe 10 and a pusher 20 for actuating the suction and discharge piston of the syringe.

The syringe 10 comprises a syringe body 11 with a closed distal end 11a and an open proximal end 11b. The syringe body defines a cylindrical chamber 12 in which a suction and discharge piston 13 is slidably mounted. The cylinder body is provided at its distal end with an outlet orifice 14 and an inlet orifice 15. The piston is connected to a piston rod 16, which passes through the open proximal end, and the free end of which cooperates with the pusher 20 for displacing the piston in the chamber, either towards the distal end in a so-called discharge direction, or towards the proximal end in a so-called suction direction.

The pusher comprises a base 21 on which the syringe body is fixedly mounted. In the present embodiment, actuation of the piston rod is achieved by a motor, preferably a stepping motor 22 equipped with a reduction gear 27, capable of driving, in both directions, a worm 23 on which an intermediate rod 24 is mounted, so that rotation of the screw causes translational displacement of the intermediate rod. The motor 22 associated with the worm 23 is schematically illustrated in the FIGURE. The worm 23 is housed in the base under the syringe body, the intermediate rod 24 being guided in translation in a housing of the base. The free end of the intermediate rod 24 extends beyond the rear face 21a of the base, and is attached via a connecting part 25 to the free end of the piston rod. For better guiding in the translation of the intermediate rod 24, the connecting part bears two guiding rods 26 which are positioned parallel on either side of the intermediate rod, and which slide in complementary housings of the base.

The motor is controlled by a control unit 3 of the distribution system, as schematically illustrated by the control line 31.

The distribution system further comprises a discharge tube 4 connected to the outlet orifice 14 of the syringe body, and a plurality of feed tubes 5, connected in parallel to the discharge tube 4 via a valve system 6. In the present embodiment, the valve system comprises several solenoid two-way microvalves 61, so-called distributing solenoid valves, referenced from $61_1$ to $61_n$, each solenoid valve having a first orifice 61a connected to the feed tube 4 via an intermediate bypass tube 62 and its second orifice being connected to a feed tube 5. Each distributing solenoid valve is controlled in opening and in closing by the control unit 3, as schematically illustrated by the control line 32. The feed tubes 5 are connected at their ends to injectors of an injection head of an injection device. With each feed tube, substance may be fed to only one injector of the head. For the purpose of simplification, a single injector 8 has been illustrated in the FIGURE. The injector notably comprises an injection body 81 and an injection needle 82 which is mounted on the injection body and which communicates with an inlet 83 of the body to which the feed tube 5 is connected for feeding the needle with substance to be injected.

The distribution system further comprises a source of substance 8 connected to the filling orifice 15 through a filling tube 81 and a valve system 82, formed by a solenoid two-way microvalve, a so-called filling solenoid valve. The filling tube is connected to the filling orifice and to a first orifice 82a of the filling solenoid valve, the source 8, such as a vaccine bag, being connected to the second orifice 82b. The filling solenoid valve is controlled in opening and in closing by the control unit 3, as illustrated by the control line 33.

As an example, the distribution system comprises twenty feed tubes 5 individually connected to the discharge tube 4 through an individual distributing solenoid valve on the one hand and to an injector 8 of an injection device on the other hand.

The injection device (not shown) conventionally comprises a fixed chassis, positioned above a conveyer for transporting eggs to be treated, the eggs being placed in the cells of trays, so-called incubation trays. The injection head is mounted on the fixed chassis. The injectors of the head are positioned above a conveyer for transporting eggs to be treated, vertically mobile between a raised position and an injection position in which the needles may inject a substance into the eggs, each injector being able to be equipped with its own displacement system. The injection device comprises a main control system controlling the displacement of the injectors between both of their positions, as well as the control unit 3 of the distribution system, the latter may be integrated to the main control system of the injection device.

The distribution system may be directly mounted on the fixed chassis of the injection head. As an example, the injection head comprises eighty injectors and four distribution systems are mounted on the chassis of the injection device, each distribution system individually feeding twenty injectors. Each distribution system comprises, as described earlier, its own source of substance for filling its syringe. Alternatively, a single source may be provided for the four distribution systems, the source being, for example, connected in parallel to the second orifices 82b of the filling solenoid valves.

A description of the operation of a distribution system will now be made.

When the injectors associated with the distribution system are in a low injection position, the control unit starts a distributing cycle, for example upon receiving a distributing command transmitted by the main control system. As the filling solenoid valve as well as all the distributing solenoid valves are in the closed position, the control unit controls the opening of the first distributing solenoid valve $61_1$, and then controls the motor 22 in order to deliver a dose of substance contained in the chamber to the injector connected to the solenoid valve $61_1$ through a feed tube 5. The control unit, for example, transmits a command via the control line 31 in order to control the rotation of the motor over a determined angle corresponding to a determined dose of substance. Upon stopping the motor, the control unit controls the closing of the first solenoid valve $61_1$. This sequence, which comprises the opening of a solenoid valve, the starting of the motor, the stopping of the motor and the closing of the solenoid valve, is carried out for the second solenoid valve $61_2$ and then for each solenoid valve right up to the last solenoid valve $61_n$. This sequence avoids any overpressure of the substance in the discharge tube. As an example, the distributing of a dose of about 50 μl of substance for an injector is carried out within about 40 ms, i.e. a cycle of 800 ms for twenty injectors.

The chamber of the syringe is dimensioned for a determined number of injection doses, known to the control unit. When the number of doses remaining in the chamber is insufficient for carrying out a distributing cycle for the whole of the twenty injectors, or for carrying out the number of distributing cycles which should be carried out by the distribution system for the treatment of a tray, the control unit initiates a filling cycle, comprising the opening of a filling solenoid valve 82, the whole of the distributing solenoid valves remaining in a closed position, the starting of the motor in order to displace the piston in the suction direction for filling the chamber by drawing the substance present in the bag, and, upon stopping the motor, the closing of the filling solenoid valve. The control unit may then initiate new distributing cycles. The chamber is dimensioned so as to allow the treatment of several successive egg trays. For safety, a sensor for sensing the position of the piston of the syringe is provided in order to initiate a filling cycle when the piston arrives at the end of its stroke, in proximity to the distal end 11a.

Advantageously, in order to optimise consumption of the treatment substance, the distribution system only supplies substance to the injectors which are positioned facing a non-empty cell, comprising a fertilized and living egg. The incubation trays may contain "clear" eggs, i.e. non-fertilized eggs, and/or "non-living" eggs, i.e. comprising dead embryos, and/or empty cells. Operations for candling the eggs of a tray may be performed, upstream from the injection operations, in order to differentiate the fertilized and living eggs from the clear or non-living eggs. This candling operation may be followed by an operation for removing clear or non-living eggs from the trays and by an operation for detecting empty cells. The information recovered during these preliminary operations is processed by the control system of the injection device in order to define for each distributing cycle, the injectors which should be fed with substance, and to transmit corresponding distributing commands to the control unit. For a distributing cycle for which only one injector connected to a solenoid valve $61_i$ is facing an empty cell or a clear and/or non-living egg, the control unit does not carry out the sequence described earlier for this solenoid valve $61_i$. Thus, after closing the microvalve $61_{i-1}$, controlling the motor, and then closing the micro-valve $61_{i-1}$, the control unit will command the opening of the microvalve $61_{i+1}$.

According to one embodiment, the control unit is also capable of varying, at each distributing cycle, the amount of substance delivered to each injector, depending on one or more characteristics of the eggs present under the injector, for example depending on the size of the egg, so as to adapt the treatment to each embryo. A detection system with a camera may be provided upstream from the injection device in order to define the size of the eggs contained in each cell. Depending on the size of the egg under an injector, the control unit adjusts the opening time of the solenoid valve associated with the injector and the number of steps performed by the motor in order to adapt the delivered dose of substance.

Alternatively, the distributing solenoid two-way valves may be replaced with one or several solenoid valves each comprising an inlet connected to the discharge tube and several outlets each connected to an injector through a feed tube.

Although the invention has been described in connection with a particular embodiment, it is not intended to be limited thereto and it is intended to comprise all the technical equivalents of the described means as well as combinations thereof.

The invention claimed is:

1. A distribution system for distributing dosed amounts of a treatment substance to a plurality of injectors of an egg injection device, comprising:
    at least one syringe pump including
        a syringe body defining a chamber adapted to receive a substance, provided with an outlet orifice and a piston slidably mounted in said chamber, and
        an actuator capable of automatically actuating said piston in order to discharge the substance out of the chamber through the outlet orifice;
    a discharge tube connected to the outlet orifice;
    feed tubes connected in parallel through a first end of each feed tube to said discharge tube via a valve system, each feed tube adapted for connection through a second end thereof to at least one injector; and
    controller that controls said actuator and said valve system in order to distribute dosed amounts of substance contained in the chamber through the feed tubes, to said injectors.

2. The distribution system according to claim 1, wherein the valve system is capable of individually setting each feed tube in fluidic communication with the discharge tube.

3. The distribution system according to claim 2, wherein the controller is adapted for controlling the actuator and valve system for independently feeding the feed tubes with either identical or different dosed amounts of substance.

4. The distribution system according to claim 2 wherein the controller is adapted for controlling the valve system and the actuator for successively feeding each feed tube.

5. The distribution system according to claim 2 wherein the valve system comprises a two-way microvalve for each feed tube, each microvalve being connected through a first orifice to the discharge tube, by means of an intermediate bypass tube, and through its second orifice to a feed tube, each microvalve being individually controlled in opening and closing by the controller.

6. The distribution system according to claim 1 wherein the syringe body is provided with a filling orifice operably connected to a filling tube equipped with a valve system, said valve system being operably connected to a source of substance, said valve system controlled in opening and in closing by the controller, and said actuator adapted to automatically actuate said piston in order to draw a substance through the inlet orifice.

7. The distribution system according to claim 1 wherein the actuator comprises a stepping motor mounted on a base, said motor adapted to rotationally drive a worm operably connected to the end of a piston rod of said piston, so that the rotation of the worm generates a movement of translation of the piston rod, the syringe body being mounted on said base, said motor being controlled by the controller.

8. An egg injection device comprising an injection head which includes a plurality of injectors capable of injecting a substance into a plurality of eggs, comprising at least one substance-distribution system according to claim 1, for distributing dosed amounts of substance to said injectors.

9. The injection device according to claim 8, wherein each feed tube is connected to only one injector.

10. The device according to claim 8 including a plurality of substance-distribution systems.

11. The device according to claim 8 wherein the distribution system is mounted on a fixed chassis of the injection device, bearing the injection head, and adapted for positioning above a conveyer for transporting eggs.

12. The device according to claim 8 wherein the controller is adapted for controlling the actuator and the valve system to independently feed the injectors with either identical or different dosed amounts of substance, adjusted for each injector depending on the characteristic of each egg present under said injector and/or on the presence of an egg to be injected or not under said injector.

\* \* \* \* \*